United States Patent
Margalit et al.

(10) Patent No.: US 11,044,144 B2
(45) Date of Patent: *Jun. 22, 2021

(54) SELF-MONITORING

(71) Applicant: ServiceNow, Inc., Santa Clara, CA (US)

(72) Inventors: Adar Margalit, Modiin (IL); Vadim Shif, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,721

(22) Filed: Jan. 9, 2020

(65) Prior Publication Data
US 2020/0228396 A1    Jul. 16, 2020

Related U.S. Application Data

(63) Continuation of application No. 15/729,457, filed on Oct. 10, 2017, now Pat. No. 10,547,501.

(60) Provisional application No. 62/568,087, filed on Oct. 4, 2017.

(51) Int. Cl.
*H04L 12/24*    (2006.01)
*G06F 9/48*     (2006.01)
*G06F 11/30*    (2006.01)
*G06F 11/34*    (2006.01)
(Continued)

(52) U.S. Cl.
CPC ........ *H04L 41/0686* (2013.01); *G06F 9/4843* (2013.01); *G06F 11/3006* (2013.01); *G06F 11/3055* (2013.01); *G06F 11/328* (2013.01); *G06F 11/3409* (2013.01); *G06F 11/3419* (2013.01); *H04L 41/046* (2013.01); *H04L 41/0681* (2013.01); *H04L 41/22* (2013.01); *H04L 41/5009* (2013.01); *H04L 43/0811* (2013.01); *H04L 43/0817* (2013.01); *H04L 43/16* (2013.01)

(58) Field of Classification Search
CPC ..... H04L 43/10; H04L 43/18; H04L 41/0803; H04L 43/08; H04L 467/1036; H04L 43/0876
See application file for complete search history.

(56) References Cited

U.S. PATENT DOCUMENTS 5,999,179 A * 12/1999 Kekic ................. H04L 41/0213
                                                        715/734
6,321,229 B1   11/2001   Goldman
6,609,122 B1    8/2003   Ensor
(Continued)

*Primary Examiner* — Kim T Nguyen
(74) *Attorney, Agent, or Firm* — Fletcher Yoder PC

(57) ABSTRACT

The present approach relates to event monitoring and management of an instance using a generated service map, allowing monitoring of CIs (e.g., applications) and connections that are currently active in a user's specific instance. A self-monitoring solution is generated for a user (e.g., via an application) that depicts status, configuration, and errors related to the user's instance. In certain implementations, the present techniques involve applying internal knowledge of the working of a user's instance and applications to perform the self-monitoring, and determine when an alert should be generated. Further, the present techniques may involve making a determination to provide a user with a self-help solution in addition or based on the self-monitoring of the user's instance.

20 Claims, 8 Drawing Sheets

(51) Int. Cl.
*G06F 11/32* (2006.01)
*H04L 12/26* (2006.01)

(56) References Cited

U.S. PATENT DOCUMENTS

| | | |
|---|---|---|
| 6,816,898 B1 | 11/2004 | Scarpelli |
| 6,895,586 B1 | 5/2005 | Brasher |
| 6,918,059 B1 * | 7/2005 | Galuten ............ G06F 11/0715 714/31 |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,229,884 B1 * | 7/2012 | Bluhm .................... G06F 16/00 707/608 |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Mueller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,547,501 B2 * | 1/2020 | Margalit ................ H04L 41/22 |

* cited by examiner

| 502 | 504 | 506 | 508 | 510 | 512 |
|---|---|---|---|---|---|
| ≡ ACTIVE | ≡ CONNECTOR DEFINITION | ≡ EVENT COLLECTION SCHEDULE (SECONDS) | ≡ EVENT COLLECTION LAST RUN TIME | ≡ LAST EVENT COLLECTION SIGNATURE | ≡ LAST EVENT COLLECTION STATUS |
| FALSE | HPOM | 120 | (EMPTY) | | |
| FALSE | HYPERIC | 120 | (EMPTY) | | |
| FALSE | IBM_NETCOOL | 120 | (EMPTY) | | |
| FALSE | SCOM | 60 | 2017-08-08 09:26:35 | 636377811635100000. 093F6FD0-3FEE-4300-B0... | SUCCESS |
| FALSE | SOLARWINDS | 120 | (EMPTY) | | |
| TRUE | vREALIZE | 120 | 2017-08-09 07:08:59 | 1502286915332 | SUCCESS |
| TRUE | ZABBIX | 120 | 2017-08-09 07:10:19 | 580816 | ERROR |

| | TIME OF EVENT | SOURCE | DESCRIPTION | NODE | TYPE | RESOURCE | MESSAGE KEY | STATE | SEVERITY |
|---|---|---|---|---|---|---|---|---|---|
| ☐ | 2017-07-27 15:36:53 | vREALIZE | HOST HAS CPU COTENTION CAUSED BY LESS T... | 10.196.39.12 | HostCPUContentionFewVMs | 10.196.39.12 | | PROCESSED | MAJOR |
| ☐ | 2017-07-27 17:28:53 | vREALIZE | VIRTUAL MACHINE HAS UNEXPECTED HIGHT MEMO... | 10.196.39.139 | VMHighMemGuestWorkload | V-W2K8-INTER.SALES. LOCALLAB DC | | PROCESSED | MAJOR |
| ☐ | 2017-07-27 18:33:17 | vREALIZE | VIRTUAL MACHINE IS EXPERIENCING HIGH NUM... | 10.196.39.225 | VMHighRxPacketsDropped | V-W2K8-Yifat | | PROCESSED | INFO |
| ☐ | 2017-07-27 20:29:17 | vREALIZE | VIRTUAL MACHINE IS EXPERIENCING HIGH NUM... | 10.196.39.211 | VMHighRxPacketsDropped | V-W2K8-BRADLEY-MID | | PROCESSED | INFO |
| ☐ | 2017-07-27 22:01:17 | vREALIZE | HOST HAS CPU COTENTION CAUSED BY LESS T... | 10.196.39.12 | HostCPUContentionFewVMs | 10.196.39.12 | | PROCESSED | MINOR |
| ☐ | 2017-07-27 23:59:17 | vREALIZE | VIRTUAL MACHINE IS EXPERIENCING HIGH NUM... | 10.196.39.175 | VMHighRxPacketsDropped | V-W2K3-R2-SQL01-S01 | | PROCESSED | INFO |
| ☐ | 2017-07-28 01:51:17 | vREALIZE | HOST HAS CPU COTENTION CAUSED BY LESS T... | 10.196.39.12 | HostCPUContentionFewVMs | 10.196.39.12 | | PROCESSED | MINOR |
| ☐ | 2017-07-28 04:27:17 | vREALIZE | HOST HAS CPU COTENTION CAUSED BY OVERPO... | 10.196.39.12 | HostCPUContentionNoSignalVM | 10.196.39.12 | | PROCESSED | CRITICAL |
| ☐ | 2017-07-28 05:43:50 | vREALIZE | VIRTUAL MACHINE IS EXPERIENCING HIGH NUM... | 10.196.39.225 | VMHighRxPacketsDropped | V-W2K8-Yifat | | PROCESSED | INFO |

SELF-MONITORING

CROSS-REFERENCE TO RELATED APPLICATION

This Application is a continuation of U.S. patent application Ser. No. 15/729,457, filed Oct. 10, 2017, which claims priority to and the benefit of U.S. Provisional Application no. 62/568,087, entitled "PLATFORM COMPUTING ENVIRONMENT AND FUNCTIONALITY THEREOF, filed Oct. 4, 2017, which is herein incorporated by reference.

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As networks become more complex, network maintenance and management becomes a more resource intensive task.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

With this in mind, an IT system may include service mapping logic that generates an accurate, service-aware view (e.g., a "service mapping") of the system infrastructure that is frequently refreshed, keeping the view up to date. The service mapping may be constructed by discovering and mapping relationships between IT components running specific services, such as in a given instance. The service mapping logic may monitor the IT infrastructure for service-affecting changes and update the service mapping in real-time. The service mapping may provide a mix of applications and IT components that support a service provided in an instance and may provide an understanding of how these applications and components are related.

The disclosed techniques enable a user to better maintain and manage a network of components. Specifically, the disclosed techniques enable a user to diagnose issues within their networks so as to allow the user to address errors that arise during operation of a computer system. Service mapped configuration items (CIs) and connections within a network are monitored for their performance. In certain aspects, the performance of a device or application may be measured in terms of Key Performance Indicators (KPIs). From the KPIs or from other monitored states or configuration data, automated routines can make determinations as to the performance of the network, such as performance of an executing job or piece of code. Based on these determinations, one or more automated processes may determine if a self-help solution displayed and implemented at the local level will be provided or if an external resource, such as a call center or field service personnel, will be implemented.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 8 is a table architecture for monitoring the status of connectors, in accordance with an embodiment; and FIG. 9 is a table architecture for monitoring status, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) is increasingly important in an electronics-driven world in which enterprises and other organizations utilize computers to conduct operations and help run their organizations. However, hardware and software resources used by organizations may take a significant time investment for users to set up, learn to operate, and trouble shoot. Typically, trouble shooting involves browsing frequently asked questions (FAQ), opening incidents online, and contacting support/service agents. This results in reduced efficiency for software resource customers as users spend a substantial amount of time looking for solutions through external resources instead of performing their usual tasks. Development of applications to facilitate support with the customer can greatly reduce downtime.

Servicing Mapping generates comprehensive maps of CIs such as devices, applications, and configuration profiles within a network. A map of CIs within a network facilitates monitoring of the communication between CIs. Monitoring may be performed in some instances by measuring various Key Performance Indicators (KPIs). KPIs are defined performance analytic measurements that may include, but are not limited to, elapsed time of communication between CIs, elapsed run time of jobs, connection time outs, and so forth. If a KPI or other measured operational parameter of a CI is above or below a threshold, an event is triggered. Events may be identified by various characteristics such as source, type, node, resource, event class, and message key. Alert rules may be in place that turn an event into an alert if a characteristic or measured KPI crosses a specified threshold, and thus signify more immediate action needs to be taken by a user to resolve the issue. In the present context, such events, whether rising to the level of alerts or not, are handled by automated routines at a local level (e.g., client site) that automatically provide either a self-help process by which a local user at the site may take action to address the event or contact an external resource (e.g., call center, field agent dispatch, and so forth) to address the event.

Figure 1:
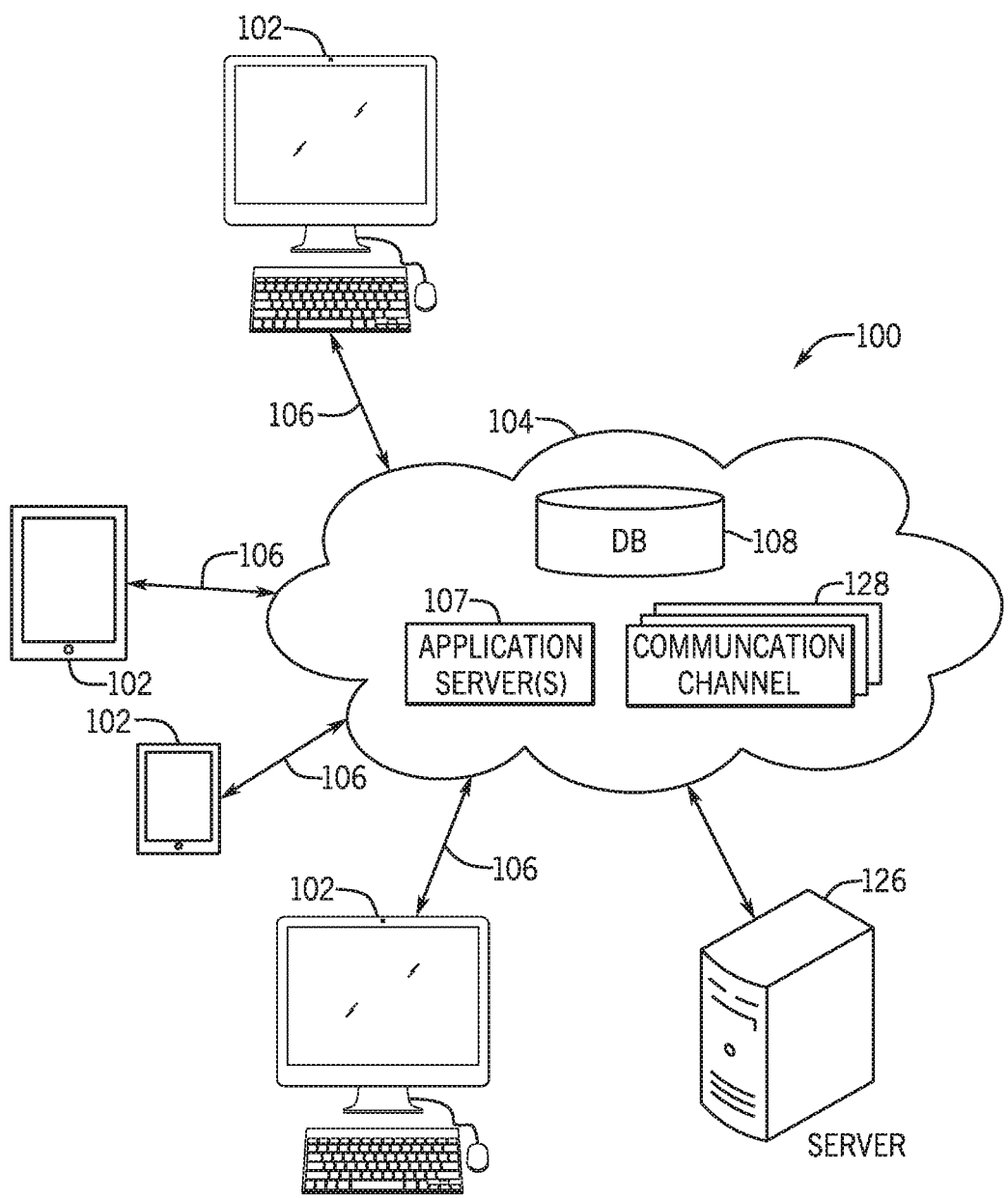
FIG. 1 is a block diagram of a distributed computing system utilizing a platform and a database (DB), in accordance with an embodiment.

With the preceding in mind, FIG. 1 is a block diagram of a system 100 that utilizes distributed computing and that may be used in conjunction with the approaches discussed herein for providing customer service. As illustrated, one or more clients 102 communicate with a platform (e.g., a cloud service) 104 over a communication channel 106. Each client 102 may include any suitable computing system, such as a mobile phone, a tablet computer, a laptop computer, a notebook computer, a desktop computer, or any other suitable computing device or combination of computing devices. Each client 102 may include client application programs running on the computing devices.

The platform (e.g., a cloud service) 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only four clients 102 are shown connected to the platform 104 in the depicted example, it should be noted that platform 104 may connect to any number of clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The DB 108 may include a configuration management database (CMDB) that includes a series of tables containing information about assets and services controlled by a client 102 and the configurations of these assets and services. The assets and services may include records of computers, other devices on a network (or group of networks), software contracts and/or licenses, enterprise services; hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models.

Additional to or in place of the DB 108, the platform 104 may include one or more other database servers. The database servers are configured to store, manage, or otherwise provide data for delivering services to the client 102 over the communication channel 106. The database server includes one or more databases (e.g., DB 108) that are accessible by the application server 107, the client 102, and/or other devices external to the databases. In some embodiments, more than a single database server may be utilized. Furthermore, in some embodiments, the platform 104 may have access to one or more databases external to the platform 104 entirely.

Access to the platform 104 is enabled by a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

The application servers 107 may store content accessible by one or more users via one of the clients. For example, the application server 107 may store one or more pages (e.g., Community pages, knowledge management pages, customer service management pages, and so forth) with which one or more of the users may interact (e.g., view, post, etc.) with other users and/or customer service agents. As a result, users may use the pages to resolve issues that arise through installation, expansion, maintenance, and regular use of the network, either on their own, or with the help of a customer service agent.

Figure 2:
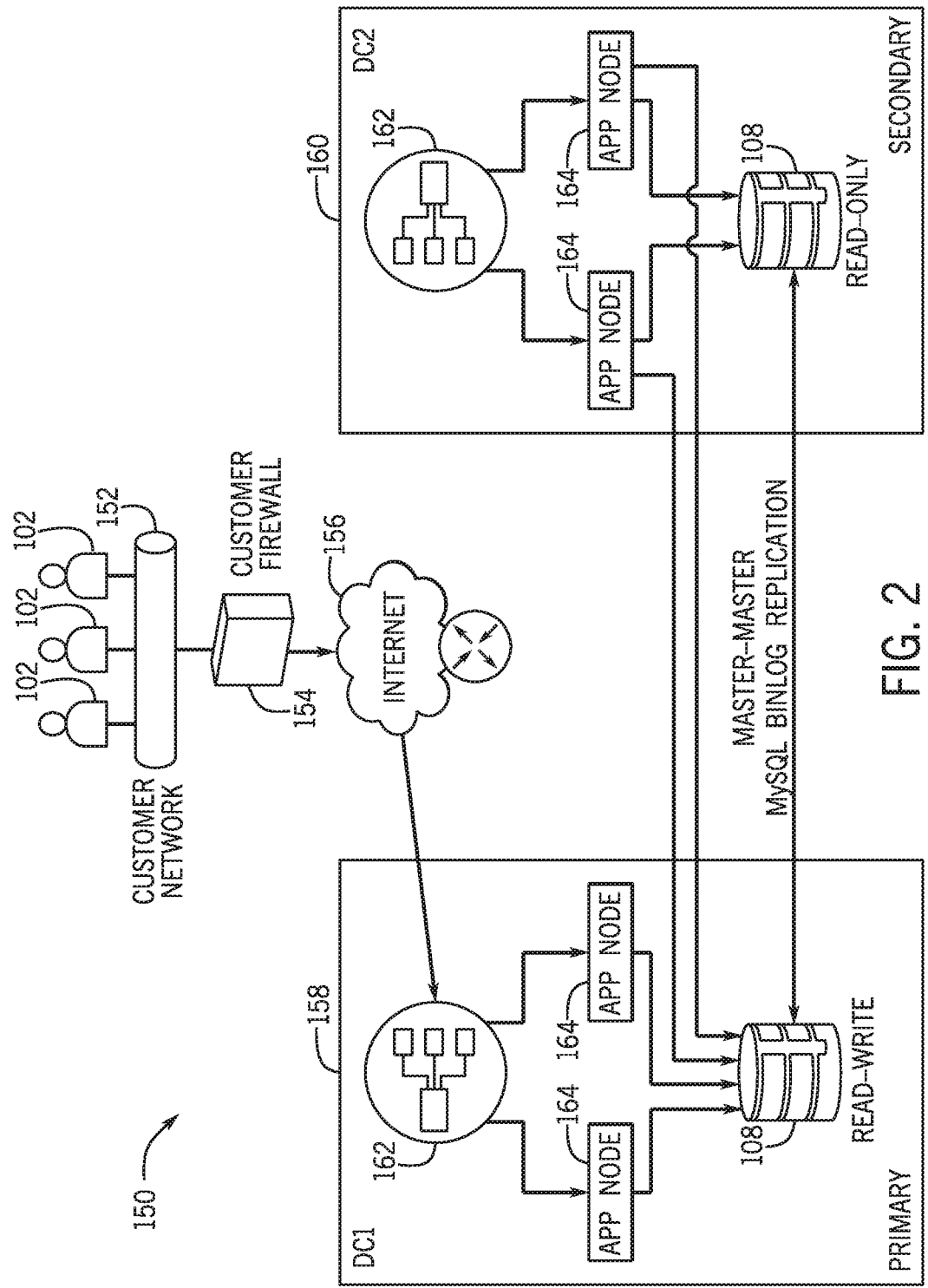
FIG. 2 is a schematic of an embodiment of a multi-instance architecture that may be utilized by the distributed computing system of FIG. 1, in accordance with an embodiment.

FIG. 2 is a schematic of an embodiment of a multi-instance architecture 150 that may be utilized by the distributed computing system 100 of FIG. 1. As shown, one or more clients 102 are connected to a customer network 152, which may or may not be protected by a firewall 154. The one or more clients 102 may access first and second virtual machines 158, 160 via the Internet 156. In the illustrated embodiment, the first virtual machine 158 is a primary virtual machine 158 and the second virtual machine 160 is a secondary virtual machine. The primary and secondary virtual machines 158, 160 are disposed in different data centers. Other embodiments may include more than two virtual machines (e.g., multiple secondary virtual machines). As shown, each of the virtual machines 158, 160 includes at least one load balancer 162, multiple application nodes 164, and a DB 108. In the illustrated embodiment, the database 108 of the primary virtual machine 158 is read-write and the database 108 of the secondary virtual machine 160 is read-only. The databases 108 are replicated via MySQL binlog replication for near real-time replication between the primary database 108 and the secondary database 108. As shown, the application nodes 164 of the primary virtual machine 158 may access the primary database 108, while the applications nodes 164 of the secondary virtual machine 160 may access both the primary database 108 and the secondary database.

Each customer may have its own dedicated virtual machines 158, 160 and database processes. Further, full and incremental backups may be scheduled as the customer wishes (e.g., daily, weekly, bi-weekly, monthly, etc.). The multi-instance architecture 150 results in full instance redundancy for all production instances with near real time replication and no comingling of data between customers.

Figure 3:
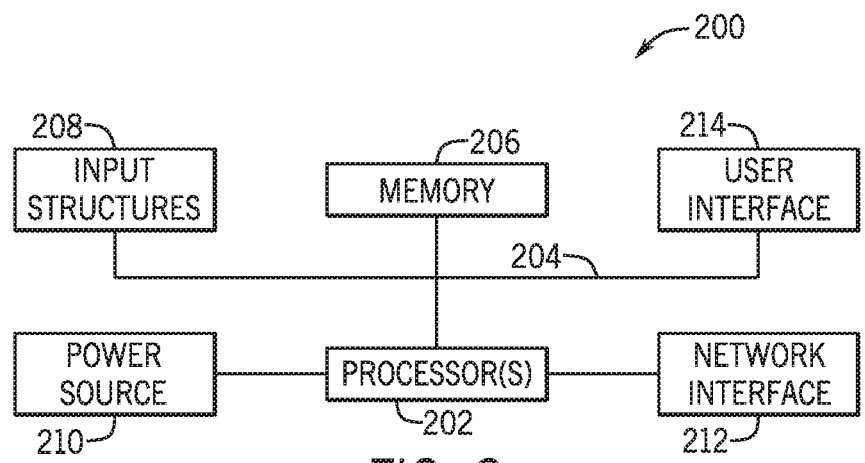
FIG. 3 is a block diagram of a computing device utilized in the distributed computing system of FIG. 1, in accordance with an embodiment.

FIG. 3 generally illustrates a block diagram of an embodiment of an internal configuration of a computing device 200. With respect to FIGS. 1-3, the computing device 200 may be an embodiment of the client 102, the application server 107, a database server (e.g., DB 108), other servers in the platform 104 (e.g., server hosting the communication channel 128), and/or a device running the server 126. These devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired and/or wireless network interface. Moreover, the computing device 200 may communicate with other devices via the network interface 212 using one or more network protocol.

A user interface 214 may include a display that is configured to display images transferred to it from the one or more processors 202. In addition to and/or alternative to the display, the user interface 214 may include other devices for interfacing with a user. For example, the user interface 214 may include lights (e.g., LEDs), speakers, haptic feedback, and the like.

The present disclosure is directed towards monitoring the performance of an instance using a generated service map, allowing monitoring of CIs (e.g., applications) and connections that are currently active in a user's specific instance. A self-monitoring solution is generated for a user (e.g., via an application) that depicts status, configuration, and errors related to the user's instance. A user may add monitors and modeling to any existing or custom application components and processes. Additionally, the present techniques involve applying internal knowledge of the working of a user's instance and applications to perform the self-monitoring, and determine when an alert should be generated. Further, the present techniques involve making a determination to provide a user with a self-help solution in addition or based on the self-monitoring of the user's instance.

Figure 4:
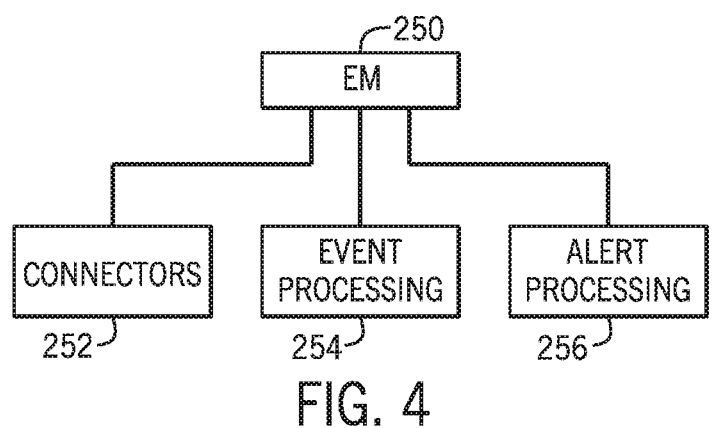
FIG. 4 is a block diagram illustrating event management, in accordance with an embodiment.

As discussed herein, a user may use a computing device 200 to access various components of a customer service architecture in order to resolve issues within that architecture. In conventional approaches, a user might submit a request for service based on an error code, contact a service representative, or search online for solutions to an issue. In certain instances it might be preferable for a user to resolve an issue themselves. FIG. 4 is a diagram of aspects of an event management 250 model in accordance with an embodiment of the present approach. By way of example, the depicted event management model may be implemented as part of a configuration management database (CMDB) as an event management service 250 provided as a manual service and as a CMDB class derived from a given application and having properties such as a connectors 252, event processing 254, and alert processing 256. In addition, the event management model may include a table (shown below with respect to FIG. 5) related to scripts to be executed as part of an event monitoring for a given job, application, or piece of executable code. For example, a script table as discussed herein may have fields corresponding to a job or script name, description of the script, the script code itself, and an active/not active field. Other relied upon tables (shown in FIG. 5) may relate to monitoring a configuration and/or a state of the job or code execution environment. Thus, a configuration and state monitor table may be provided as one or as separate tables having fields such as monitored parameter name, description, active/not active, first threshold (e.g., event threshold), second threshold (e.g., alert threshold), frequency, last run, last value, last status, additional information, to be reported, and so forth).

A typical event management system receives event indications through any protocol for sending events, including, but not limited to, MID servers, REST, connectors using APIs, SNMP trap, email, etc.). As these events occur, certain embodiments might involve a MID server sending the events to an external support center (e.g., a data center or remote monitoring site). Event management generates events, applies rules (i.e., determining how an event becomes an alert), and prioritizes events or alerts for remediation. In the depicted model, event management 250 may include monitoring event connectors 252 and generating events or alerts as appropriate based on the monitored parameters and appropriate evet generation scripts. In certain embodiments, monitoring event connectors 252 may involve monitoring the current status (success/error) of an event connector 252, monitoring a delay associated with the event connector 252, or monitoring an elapsed time (e.g., last run time), and determining whether each monitored action is above or below a threshold.

Figure 5:
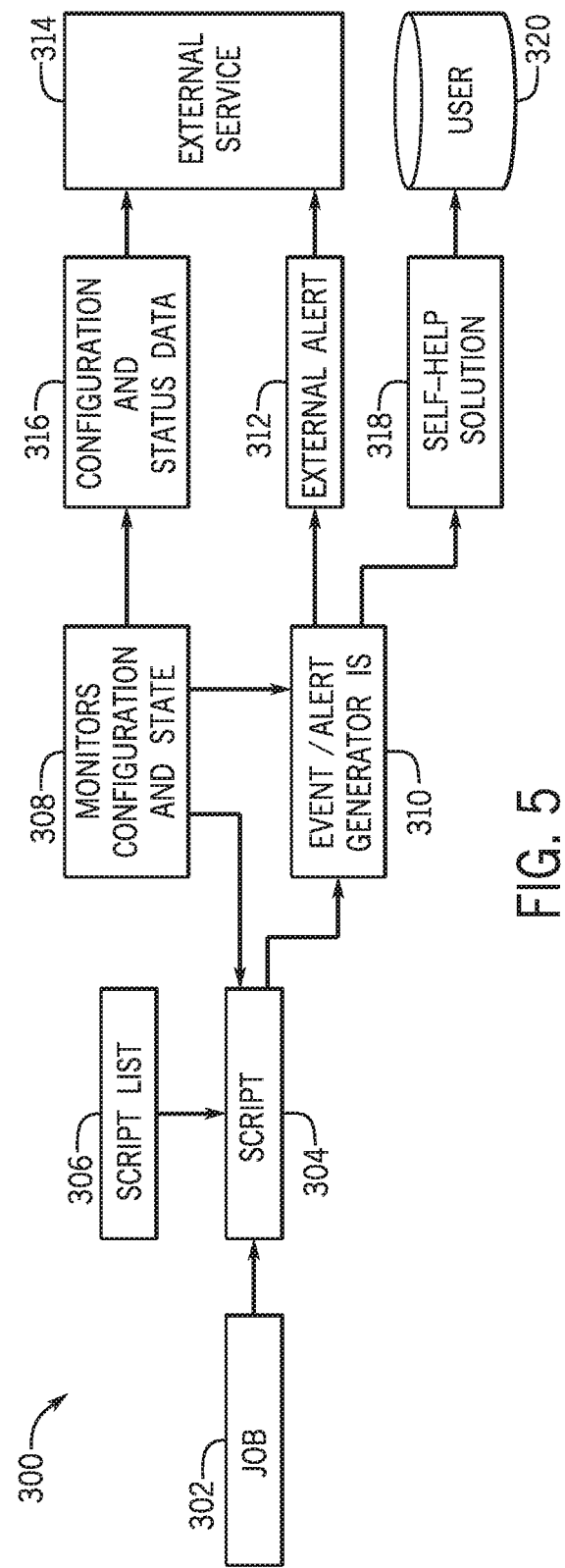
FIG. 5 is a flow chart of a process for monitoring events and providing self-help to a user, in accordance with an embodiment.

FIG. 5 is a flow chart of an event generation system 300 in accordance with certain embodiments. In general, a job 302 is executed on a computer system, either as part of a routine or automated process or in response to a user input. In certain embodiments, a job 302 might be running an application, initializing a connection with a CI, transmitting data to a CI, or retrieving data from a CI. For every job, there is one or more associated script 304. Each script 304, when executed, is configured to determine an event output based on a monitored configuration and state of a CI or other network or system parameter. Scripts 304 for each job 302 are stored in a script table 306 or list which is stored on the CMDB and a corresponding script or scripts 304 is retrieved from the script list 306 upon initializing or running a job 302.

In response to the job 302 being run, the list of scripts 306 is accessed and the appropriate script or scripts is retrieved and run. In certain embodiments, the scripts 304 may be run according to a specified frequency or based on a last run time. The executed script 304 may receive or retrieve as inputs one or more sets of monitored data 308 from one or more CIs referenced by the script 304, such as monitored data 308 conveying observations related to network or device configurations, operating parameters, operational states, and so forth). Based on these inputs and the code of the script 304, a script output is generated that is provided to an alert/event generator 310 which, based on the script output, can generate an event or alert (such as if the script output indicates a monitored parameter exceed an event threshold or an alert threshold). By way of example, the executed script 304 accesses monitored data to determine configuration and state information for one or more components or devices implicated in the execution of the job 302. For example, the executed script might monitor status (e.g., success/error) of the job 302, the elapsed time of a job run, delay of any events, number of actual jobs versus configuration possibly depending on the number of nodes in the instance, or verify that the number of jobs meet certain configurations. If the script output based on any of the configuration or state information indicates a value monitored by the script 204 exceeds a threshold, an event or alert is generated 310, depending on the degree of deviation of the monitored value from expected norms.

As part of the event/alert generation at block 310, a determination is made whether to send an alert to an external help site (e.g., call center, field agent), such as by sending an external alert 312 to a remote site, or whether to send the alert and provide a self-help solution 318 to a user 320.

In the depicted example, an external alert 312 results in informing an external service 314 (e.g., external data center, service center, or monitoring instance) of the event or alert generated in block 310. In addition to an alert, configuration and status data 316 (e.g., a detailed report of the configuration and state of the job and/or other useful network or device information) is sent to the other external service 314 to provide a more detailed explanation of the issue or source of the alert to the external service 314.

As noted above, a determination may instead be made at the event/alert generator 310 to provide a self-help solution 318. If such a self-help solution 318 is determined to be appropriate, a user may be provided with instructions or an executable routine that allow the user to address the event or alert without implicating an external help site. In such self-help contexts, the user can address the event or alert promptly, rather than wait for a solution to be provided from the external service 314. In certain embodiments, records of event and alerts and the appropriate self-help solution 318 might be stored in a database accessible by the alert generation system 300. A self-help solution 318 might be any combination of the following: an immediate solution to the event that triggered an alert (e.g., an update, providing a missing file, initializing a reset), a direction to a FAQ page, refreshing memory, or an indication of the source, severity, location, or time of event. A self-help solution 318 might be provided to the user (e.g., automatically triggering a workflow, or opening an incident, etc.)

In certain embodiments, a user may receive a self-help solution through a graphical user interface that displays a service map for an instance and all associated events and alerts between aspects of the instance. The service map may show dependencies between the components to enable a user to prioritize alerts and events. A graphical user interface that displays a service map and all associated events and alerts associated with an instance may serve as an analysis tool to help a user determine the root cause of events/alerts, and how to respond.

Figure 6:
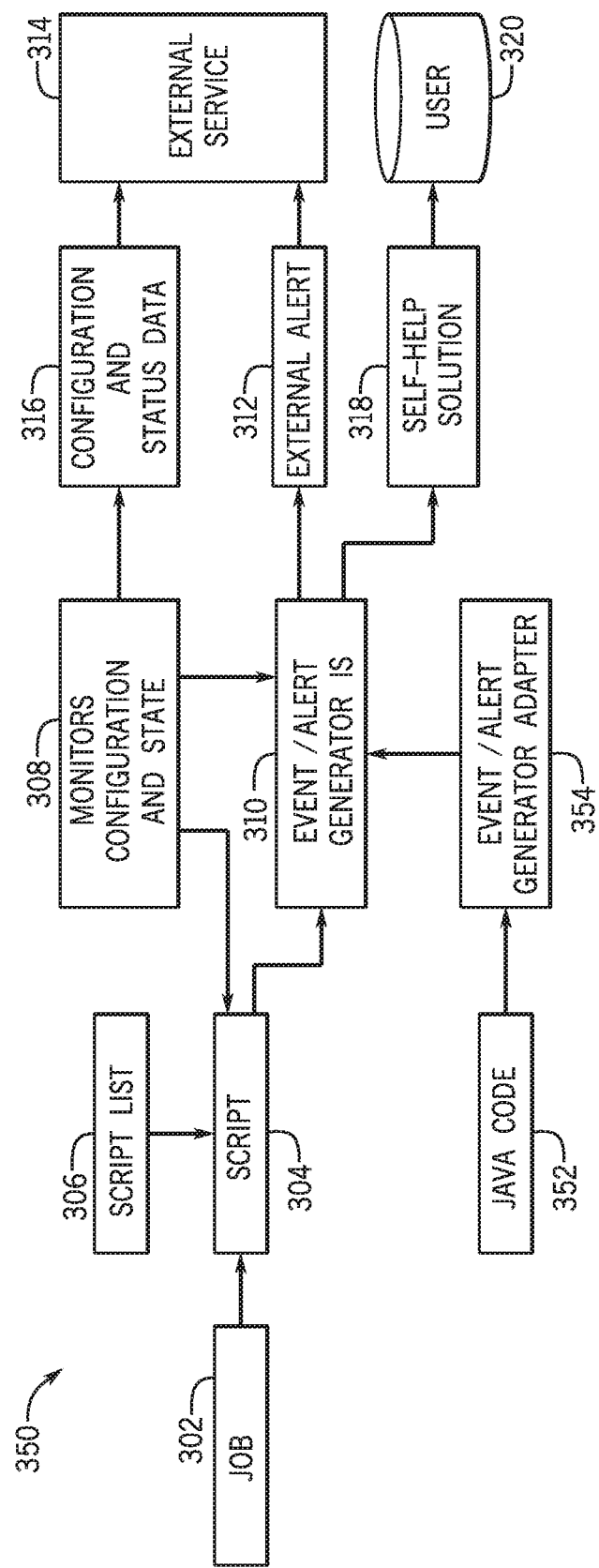
FIG. 6 is a flow chart of providing alerts due to errors in code that runs with the process illustrated in FIG. 6, in accordance with an embodiment.

FIG. 6 is a flow diagram, in accordance with an embodiment of the present disclosure illustrated in FIG. 5, but includes an additional path for monitoring errors in code. For example, code 352 may contain errors when executed and/or may otherwise be poorly optimized. Such errors or poor optimization may manifest in the monitored configuration and state data as memory misallocation errors, extended run times, hanging threads, and so forth. In certain embodiments, it might be advantageous to monitor code 352 for such sub-optimization indications. Events that arise from the code 352 are processed 354 and based on KPIs, may be deemed an event or alert if the KPI exceeds a respective threshold. In such instances, as in the preceding example, logic within the system automatically determines whether an external help request is provided or self-help is provided (e.g., a software patch or update, a firmware or BIOS update, and so forth).

Figure 7:
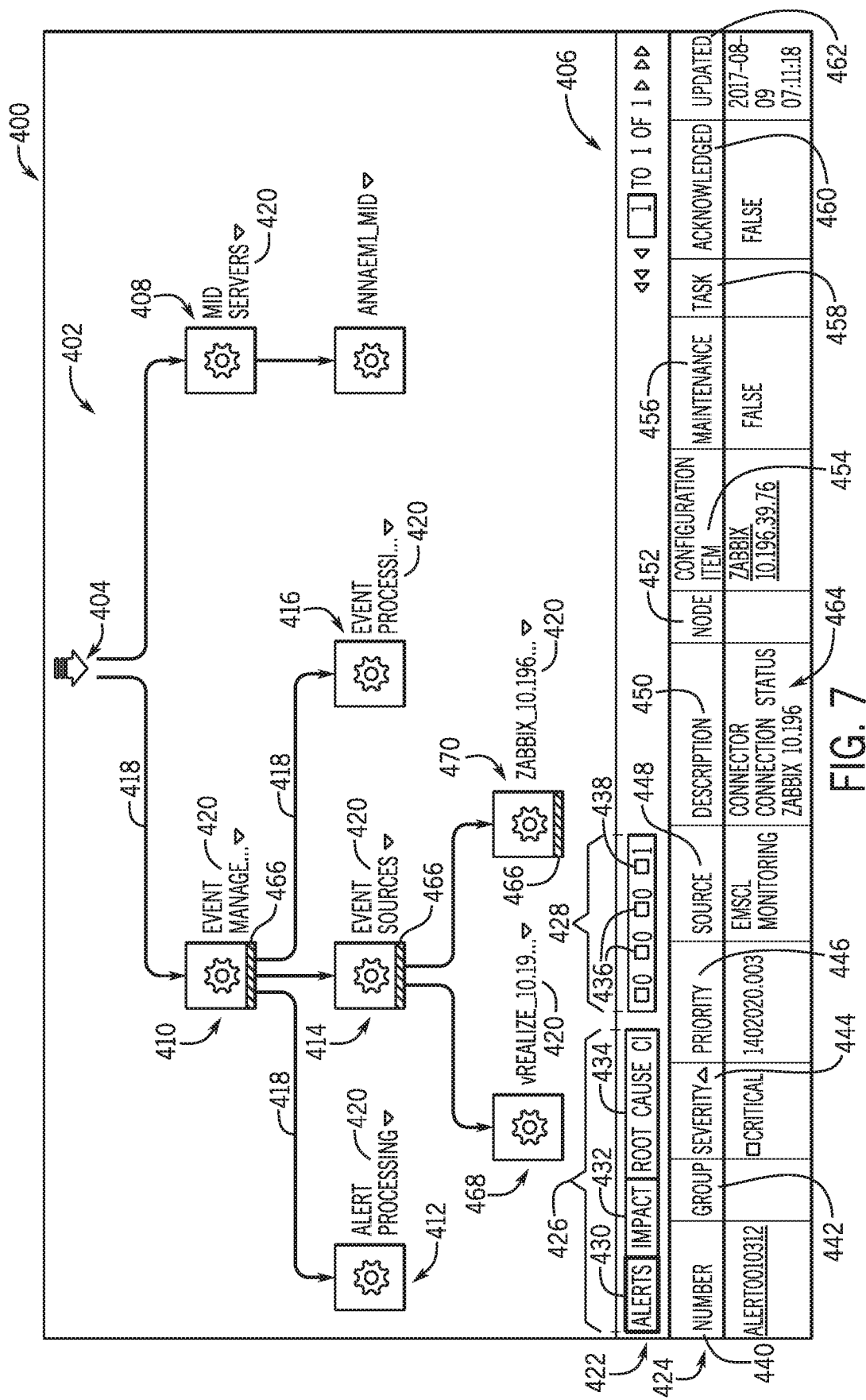
FIG. 7 is an illustration of a screen visible to a user to enable self-help during event management, in accordance with an embodiment.

FIG. 7 is an illustration of a self-help application 400 for a user in accordance with an embodiment of the present disclosure. The self-help application 400 displays a model of components being monitored, interconnections between these components, and events/alerts associated with particular components that are specific to the user's instance. Further, the self-help application 400 display illustrates the impact of events and allows root cause to be determined, such as by visual analysis. Even further, the self-help help application 400 provides the ability of the user to add monitors and modeling to any existing or custom application components and processes. The self-help application 400 shows an event map 402 of a configuration item 404 and an interactive window 406. The event map 402 results from a job run on a configuration item 404 and the event map 402 displays the configuration items connection to MID servers 408 as well as the associated event management 410 to enable a user to find and track sources of errors or issues.

As discussed in FIG. 4, the event manager monitors at least alert processing 412, event sources 414, and event processing 416. Each icon (i.e., box) monitored by event management 410 is related to event management 410 by connection arrows 418. Thus, a hierarchy of relationships between monitored components is present. Beside each icon of the event map 402, there is an arrow 420 that allows a user to collapse and expand portions of the event map 402. This enables a user to organize and improve the clarity of the information displayed on the event map. For example, a user may only want to monitor event source 414. Therefore, the user could select all arrows 420 associated with MID servers 408, event processing 416, and alert processing 412 to efficiently determine the errors within event sources 414.

The interactive window 406 gives a user more information about an alert. In this illustrated embodiment, the interactive window includes a first row of tabs 422 and a second row of tabs 424. In this illustrated embodiment, the first row of tabs 422 includes selectable tabs 426 and an alert severity count 428. The selectable tabs 426 including alerts 430, impact 432, and root cause CI 434 that control what is being displayed in the content window. For example, if the user wants to see all alerts associated with the event map 402, they would select alerts 430. The alert severity count 428 displays the number of each alert that has a rank of a certain severity. This embodiment shows four categories of alert severity 436 and an associated number 438 that indicates how many errors are of a particular alert severity 436. In certain embodiments, there may be fewer or more categories of alert severity.

A second row of tabs 424 includes a number tab 440, a group tab 442, a severity tab 444, a priority tab 446, a source tab 448, a description tab 450, a node tab 452, a configuration item tab 454, a maintenance tab 456, a task tab 458, an acknowledged tab 460, and an updated tab 462. The first row of tabs 422 control what is displayed in a window 464 below the tabs. Selecting the any of the tabs 440, 442, 444, 446, 448, 450, 452, 454, 456, 458, 460, or 462 causes the window to display the associated information under each tab (e.g., in chronological order, order of importance/relevance, etc.) to the user. For example, if the severity tab 444 is selected, all alerts can be reorganized increasing or decreasing order of severity. The number tab 440 displays the alert code. A group tab 442 might display an organizational group of the alert or the configuration item. The severity tab 444 displays the ranking of severity of an alert. The priority tab 446 displays an associated numerical value that corresponds to how readily an alert or event should be addressed. The source tab 448 shows the origin of the error within the event mapping. The description tab 450 gives a user information pertaining to the type or source of the error. The node tab 452 shows the location of the source of the error. The configuration item tab 454 shows the ID of the configuration item that is associated with the error. The maintenance tab 456 displays if there has been an attempt or success at maintenance on the alert. The task tab 458 displays a suggestion or instructions of how a user might fix the error. The acknowledged tab 460 displays whether or not an alert has been received by the user (e.g., selected, responded to a prompt). The updated tab 462 gives an indication of when the alert was sent to the user via the interactive window. It should be noted that certain embodiments may not require all of the tabs listed above, and in some embodiments more or less tabs related to an alert might be provided.

An example of how a user might use the event map is as follows. After a user executes a job, and the steps listed for FIG. 4 or FIG. 5 have finished, or are running simultaneously to provide updates of new alerts, the event map 402 is updated and displayed for a user. As illustrated, there is an alert indicator 466 on the even management 410 icon. Selecting the arrow 420 associated with the event management 410 icon displays three additional monitored items: alert processing 412, event sources 414, and event processing 416. As illustrated, the alert indicator 466 is signifying an alert within the event sources icon 414. Selecting the arrow 420 associated with event sources 414 displays two CIs 468 and 470. In this illustration, configuration item 470 (i.e., 'Zabbix_10.196 . . . ') is the source of the alert that resulted in the alert indicator 466.

FIG. 8 is a table architecture 500 for monitoring connector instances. As shown, the table architecture contains an active tab 502, a connector definition tab 504, an event collection schedule tab 506, an event collection last run time tab 508, a last event collection signature tab 510, and a last event collection status tab 512. The active tab displays whether or not a connector defined in the connector definition tab is active. The event collection schedule tab shows the interval at which the events relating to the connector are taken. The event collection last run time displays a time and date of the last event collection for each connector listed under the connection definition tab. The last even collection signature displays a signature as an output from the last run time. The success of the last run event collection is displayed under the last event collection status.

FIG. 9 is a table architecture 550 for monitoring events. As shown, the table architecture contains a time of event tab 552, a source tab 554, a description tab 556, a node tab 558, a type tab 560, a resource tab 562, a message key tab 564, a state tab 566, and a severity tab 568. A user can click on any of the tabs and reorder the display based the information contained under each tab. For example, a user clicking the severity tab 568 could address events that are deemed more severe (e.g. denoted with labels 'major' or critical') than the 'minor' errors.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising instructions that, when executed by a processor, cause the processor to perform operations comprising:
receiving data associated with one or more configuration items of an instance, wherein the received data comprises: performance data, configuration data, or state data, or a combination thereof, associated with the one or more configuration items of the instance;
executing a script configured to generate a script output based on the received data;
determining an alert based at least in part on the script output, wherein the alert is indicative of an abnormality experienced by the one or more configuration items;
identifying a self-help solution to address the abnormality; and
providing the self-help solution, comprising providing, to a client device associated with the instance, at least a portion of a service map, wherein the portion of the service map comprises at least one configuration item of the one or more configuration items, and wherein the at least one configuration item is visually associated with the alert.

2. The tangible, non-transitory, machine-readable medium of claim 1, wherein the script output is determined, at least in part, based on outputs from one or more event connectors.

3. The tangible, non-transitory, machine-readable medium of claim 1, wherein the script output is determined, at least in part, by monitoring processing jobs of the instance.

4. The tangible, non-transitory, machine-readable medium of claim 1, wherein the received data comprises operating states of the one or more configuration items of the instance.

5. The tangible, non-transitory, machine-readable medium of claim 1, wherein the one or more configuration items comprises a plurality of configuration items.

6. The tangible, non-transitory, machine-readable medium of claim 1, wherein providing the self-help solution comprises providing an executable routine or patch configured to remedy the alert.

7. The tangible, non-transitory, machine-readable medium of claim 1, wherein the received data comprises a plurality of key performance indicators.

8. The tangible, non-transitory, machine-readable medium of claim 7, wherein the plurality of key performance indicators comprises an elapsed time of communication between the one or more configuration items, elapsed run time of jobs of the instance, a connection time out, or a combination thereof.

9. A system, comprising:
a non-transitory memory; and
one or more hardware processors configured to read instructions from the non-transitory memory to perform event management operations comprising:
receiving data associated with one or more configuration items of an instance, wherein the received data comprises: performance data, configuration data, or state data, or a combination thereof, associated with the one or more configuration items of the instance;
executing a script configured to generate a script output based on the received data;
determining, based at least in part on the script output, an abnormality corresponding to the one or more configuration items;
determining, based on the script output, whether a first condition is met, wherein the first condition is associated with the abnormality;
in response to determining that the first condition is met, referring a client device associated with the instance to an external assistance; and
in response to determining that the first condition is not met, identifying a self-help solution to address the abnormality and providing the self-help solution to the client device associated with the instance.

10. The system of claim 9, wherein providing the self-help solution comprises providing at least a portion of a service map, wherein the portion of the service map comprises at least one configuration item of the one or more configuration items, and wherein the at least one configuration item is visually associated with an alert associated with the abnormality.

11. The system of claim 10, wherein the performance data, the configuration data, or the state data are represented as icons displayed on an interface of the client device.

12. The system of claim 9, wherein the self-help solution comprises an executable routine or patch.

13. The system of claim 9, wherein the script output is based at least in part on errors in a code associated with a job running on the instance.

14. The system of claim 9, wherein the self-help solution comprises directing the client device associated with the instance to a frequently asked questions (FAQ) page.

15. The system of claim 9, wherein the script output is determined by user-defined monitors.

16. The system of claim 9, wherein the script output comprises an event if a metric of the performance data, the configuration data, or the state data is above an event threshold, and wherein the script output comprises an alert if the metric of the performance data, the configuration data, or the state data is above an alert threshold.

17. A method comprising:
accessing a service map of an instance, wherein the service map includes one or more configuration items and connections associated with the instance;
executing a script configured to generate a script output based on a monitored configuration and state data for the one or more configuration items and connections of the service map, wherein the script output comprises an event generated in response to a metric of the monitored configuration and state data being above a first threshold, wherein the event comprises an abnormality associated with the one or more configuration items and connections;
determining, based on the script output, whether a first condition is met; and
in response to determining that the first condition is not met, identifying a self-help solution to address the abnormality and providing the self-help solution to a client device associated with the instance, wherein providing the self-help solution comprises providing at least a portion of the service map comprising the event and the one or more configuration items and connections.

18. The method of claim 17, wherein the script output comprises an alert generated in response to the metric of the monitored configuration and state data being above a second threshold, wherein the first threshold is less than the second threshold.

19. The method of claim 18, wherein the event is configured to be recorded in a database, and wherein the alert is configured to be provided to the client device with priority.

20. The method of claim 17, wherein, in response to determining the first condition is met, making a second event management determination based on the script output to refer the client device to external assistance.

* * * * *